United States Patent
Deguchi

(10) Patent No.: US 8,946,615 B2
(45) Date of Patent: Feb. 3, 2015

(54) IMAGE SENSOR CIRCUIT

(71) Applicant: Kabushiki Kaisha Toshiba, Tokyo (JP)

(72) Inventor: Jun Deguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 13/780,616

(22) Filed: Feb. 28, 2013

(65) Prior Publication Data

US 2014/0008518 A1    Jan. 9, 2014

(30) Foreign Application Priority Data

Jul. 3, 2012    (JP) .................................. 2012-149699

(51) Int. Cl.
*H01L 27/00*    (2006.01)
*H04N 5/378*    (2011.01)

(52) U.S. Cl.
CPC ..................................... *H04N 5/378* (2013.01)
USPC .................... 250/208.1; 250/214 R; 348/302; 348/308; 348/322

(58) Field of Classification Search
USPC ................... 250/208.1, 214.1, 214 R, 214 LS, 250/214 AG, 214 DC; 348/294, 302, 303, 348/308, 320, 322
See application file for complete search history.

(56) References Cited

U.S. PATENT DOCUMENTS 7,649,548 B1 * 1/2010 Knuutila et al. ......... 348/207.11
2008/0180559 A1 * 7/2008 Yan ............................... 348/307

OTHER PUBLICATIONS

Seunghyun Lim, et al., "A High-Speed CMOS Image Sensor With Column-Parallel Two-Step Single-Slope ADCs", IEEE Transactions on Electron Devices, vol. 56, No. 3, Mar. 2009, pp. 393-398.

* cited by examiner

*Primary Examiner* — Kevin Pyo
(74) *Attorney, Agent, or Firm* — Oblon, Spivak, McClelland, Maier & Neustadt, L.L.P.

(57) ABSTRACT

The controlling circuit of the image censor circuit controls the row decoder to address the light receiving cell with the address signal to turn on the first MOS transistor and turns on the switch circuit with a switch controlling signal, and then controls the row decoder to turn off the first MOS transistor and then turns off the switch circuit with the switch controlling signal.

20 Claims, 3 Drawing Sheets

IMAGE SENSOR CIRCUIT

CROSS-REFERENCE TO RELATED APPLICATION

This application is based upon and claims the benefit of priority from the prior Japanese Patent Application No.2012-149699, filed on Jul. 3, 2012, the entire contents of which are incorporated herein by reference.

BACKGROUND

1. Field

Embodiments described herein relate generally to an image sensor circuit.

2. Background Art

A conventional image sensor circuit has a source follower that reads a pixel signal input to a floating diffusion (FD) and a single slope analog-to-digital converter (ADC) that A/D-converts the read signal.

DETAILED DESCRIPTION

An image sensor circuit according to an embodiment includes a column line connected to a sample holding terminal. The image sensor circuit includes a light receiving cell including a first MOS transistor that is connected between a power supply and the column line and receives an address signal at a gate thereof and a second MOS transistor that is connected in series with the first MOS transistor between the power supply and the column line and receives a voltage responsive to received light at a gate thereof. The image sensor circuit includes a row decoder that generates the address signal that addresses the light receiving cell. The image sensor circuit includes a sample holding circuit including a current source that is connected between the column line and a ground and outputs a constant current and a switch circuit connected in series with the current source between the column line and the ground. The image sensor circuit includes a controlling circuit that controls the row decoder and the switch circuit of the sample holding circuit. The controlling circuit controls the row decoder to address the light receiving cell with the address signal to turn on the first MOS transistor and turns on the switch circuit with a switch controlling signal, and then controls the row decoder to turn off the first MOS transistor and then turns off the switch circuit with the switch controlling signal.

In the following, embodiments will be described with reference to the drawings.

First Embodiment

Figure 1:
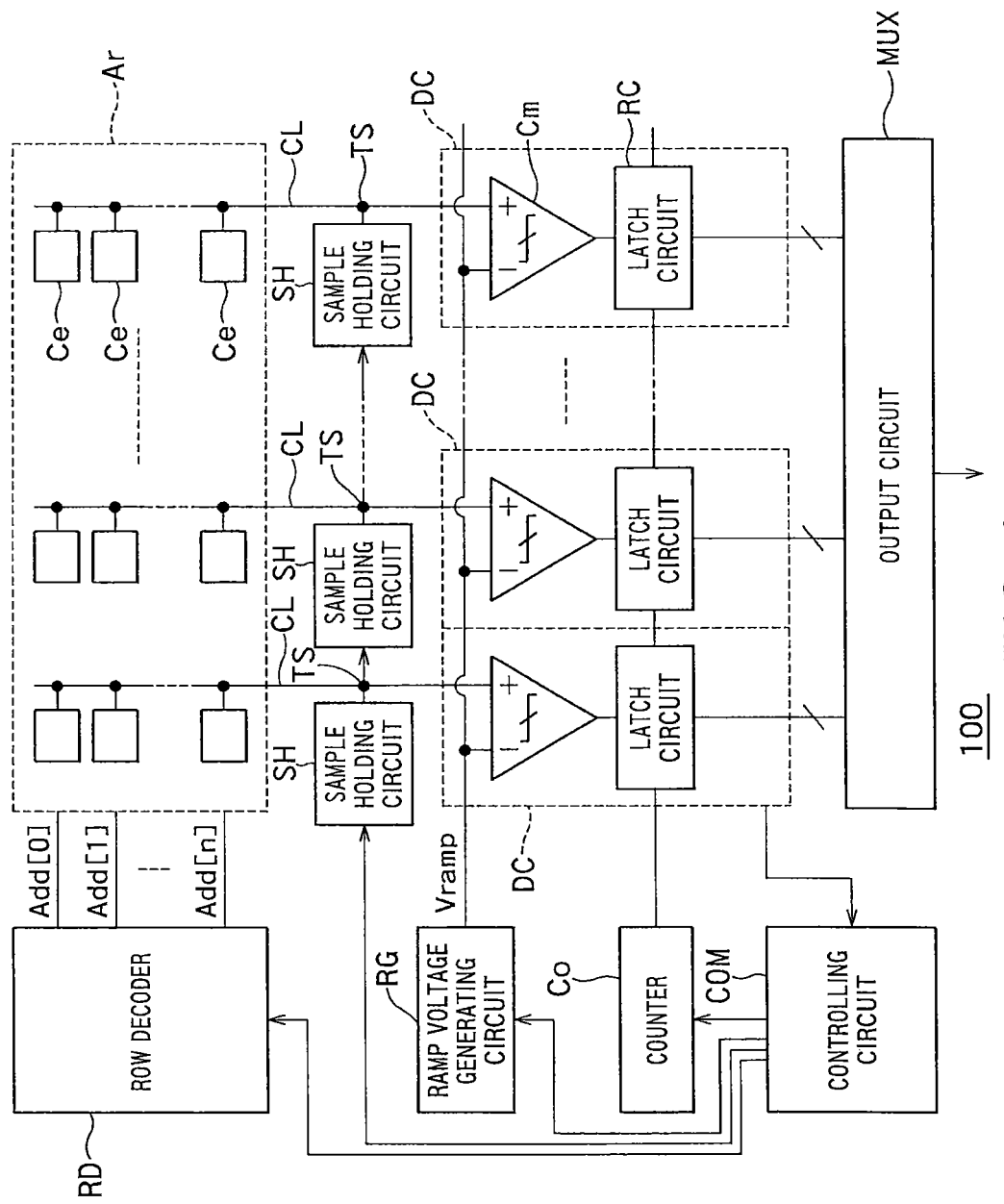
FIG. 1 is a block diagram showing an example of a configuration of an image sensor circuit 100 according to a first embodiment.
Figure 2:
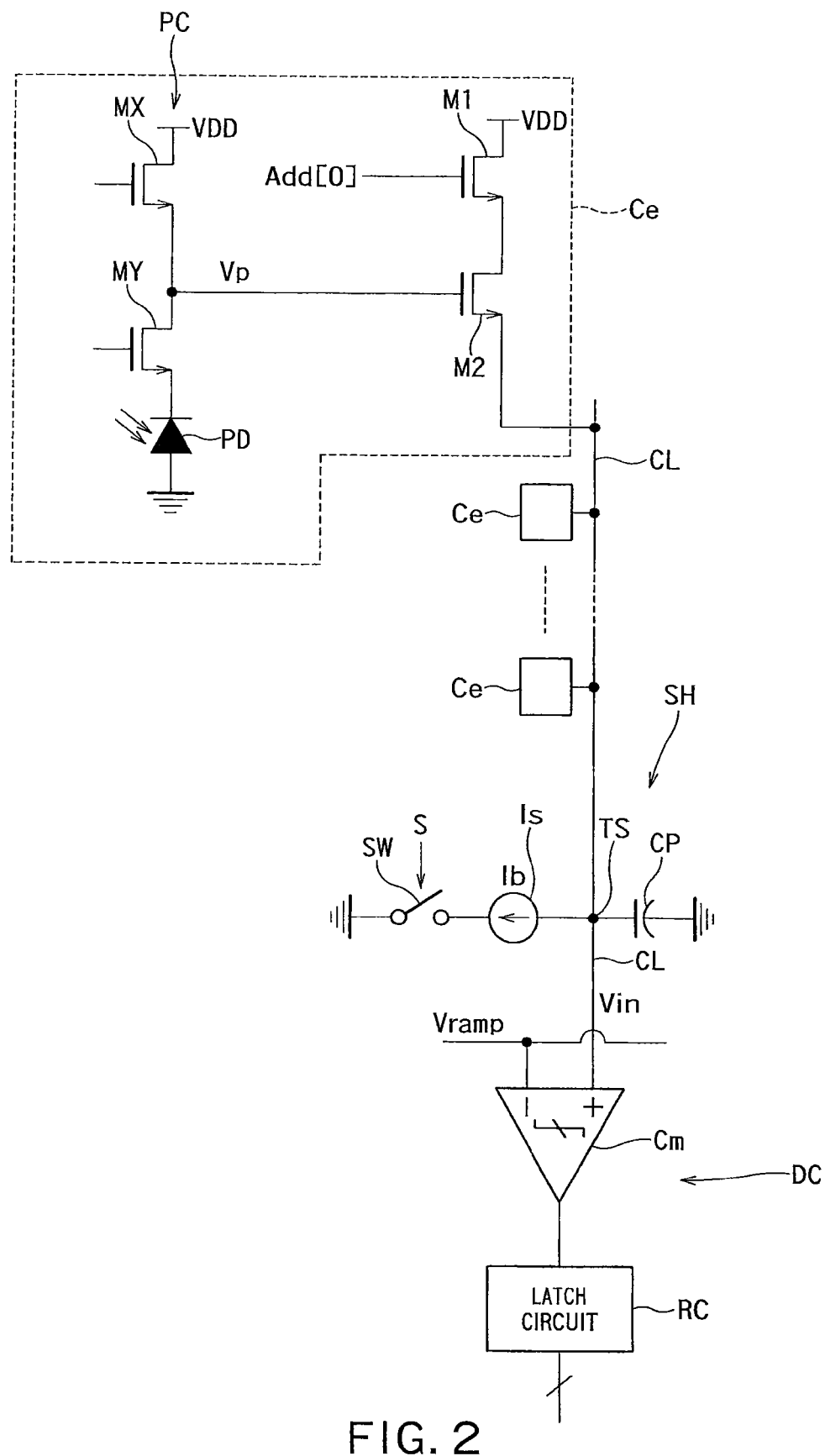
FIG. 2 is a circuit diagram showing, in particular, an example of a configuration of light receiving cells, a sample holding circuit and a detecting circuit shown in FIG. 1.

FIG. 1 is a block diagram showing an example of a configuration of an image sensor circuit 100 according to a first embodiment. FIG. 2 is a circuit diagram showing, in particular, an example of a configuration of light receiving cells, a sample holding circuit and a detecting circuit shown in FIG. 1.

As shown in FIG. 1, the image sensor circuit 100 includes a pixel array "Ar", a plurality of column lines "CL", a plurality of sample holding circuits "SH", a row decoder "RD", a ramp voltage generating circuit "RG", a counter "Co", a plurality of detecting circuits "DC", an output circuit "MUX", and a controlling circuit "COM".

The pixel array "Ar" includes a plurality of light receiving cells "Ce" arranged in a matrix.

The row decoder "RD" is configured to generate address signals "Add[0]", "Add[1]", "Add[n]" that address the light receiving cells "Ce".

The row decoder "RD" addresses one of the plurality of light receiving cells "Ce" with the address signals "Add[0]", "Add[1]", "Add[n]". The addressed light receiving cell "Ce" outputs a signal responsive to the received light to the column line "CL".

As shown in FIG. 2, the light receiving cell "Ce" includes a light receiving circuit "PC", a first MOS transistor "M1", and a second MOS transistor "M2", for example. As described later, the first and second MOS transistors "M1" and "M2" have a parasitic capacitance. That is, the pixel array "Ar" including the plurality of light receiving cells "Ce" is increased in number of light receiving cells "Ce".

The light receiving circuit "PC" is configured to receive light and output a voltage (a pixel signal) "Vp" responsive to the received light to the gate of the second MOS transistor "M2".

As shown in FIG. 2, the light receiving circuit "PC" includes an first reset nMOS transistor "Mx", an second reset nMOS transistor "My" and a photo diode "PD", for example.

The first reset nMOS transistor "Mx" is connected to a power supply "VDD" at the drain thereof and to the gate of the second MOS transistor "M2" at the source thereof. A predetermined voltage is applied to the gate of the first reset nMOS transistor "Mx".

The second reset nMOS transistor "My" is connected to the gate of the second MOS transistor "M2" at the drain thereof. A predetermined voltage is applied to the gate of the second reset nMOS transistor "My".

The photo diode "PD" is connected to the source of the second reset nMOS transistor "My" at the cathode thereof and to the ground at the anode thereof.

For example, the value of the voltage "Vp" is reset (the value of the voltage "Vp" becomes the source voltage) by turning on the first reset nMOS transistor "Mx" and turning off the second reset nMOS transistor "My".

On the other hand, the value of the voltage "Vp" becomes the Value responsive to the received light by turning off the first reset nMOS transistor "Mx" and turning on the second reset nMOS transistor "My".

The first MOS transistor "M1" is connected between the power supply "VDD" and the column line "CL" and is configured to receive the address signal (the address signal "Add [0] in FIG. 2, for example) at the gate thereof. The first MOS transistor "M1" is turned on when it is addressed by the address signal "Add[0]" (that is, the address signal "Add[0]" becomes the "High" level). The first MOS transistor "M1" is in the off state when it is not addressed by the address signal "Add[0]" (that is, the address signal "Add[0]" is at the "Low" level).

The second MOS transistor "M2" is connected in series with the first MOS transistor "M1" between the power supply "VDD" and the column line "CL" and is configured to receive the voltage "Vp" responsive to the received light at the gate thereof.

As shown in FIG. 2, the first and second MOS transistors "M1" and "M2" are nMOS transistors, for example.

That is, the light receiving cell "Ce" has a source follower circuit.

As shown in FIGS. 1 and 2, the column line "CL" is connected to a sample holding terminal "TS".

As shown in FIG. 1, the plurality of sample holding circuits "SH" are provided in a one-to-one relationship with the plurality of column lines "CL".

As shown in FIG. 2, the sample holding circuit "SH" includes a current source "Is" and a switch circuit "SW", for example.

The current source "Is" is connected between the column line "CL" and the ground and is configured to output a constant current "Ib".

The switch circuit "SW" is connected in series with the current source "Is" between the column line "CL" and the ground.

The switch circuit "SW" is a MOS transistor whose gate voltage is controlled by the controlling circuit "COM", for example.

There is a parasitic capacitance "Cp" between the sample holding terminal "TS" and the second MOS transistor "M2" of the light receiving cell "Ce". The capacitor "Cp" has a function of sample-holding a voltage "Vin" at the sample holding terminal "TS".

Thus, the sample holding circuit "SH" also includes the capacitor "Cp" as a component thereof, and the capacitor "Cp" enables the sample holding circuit "SH" to serve the function of sample-holding the voltage "Vin" at the sample holding terminal "TS".

In addition to the capacitor "Cp", the sample holding circuit "SH" may further include an additional capacitor connected between the column line "CL" and the ground.

As shown in FIGS. 1 and 2, the detecting circuit "DC" is configured to detect the voltage "Vin" at the sample holding terminal "TS" and output a signal (a digital signal) based on the detection result.

As shown in FIG. 1, the detecting circuit "DC" includes a comparator "Cm" and a latch circuit "RC".

The comparator "Cm" is configured to compare the voltage "Vin" at the sample holding terminal "TS" with a ramp voltage "Vramp" and output a comparison result signal responsive to the comparison result.

The latch circuit "RC" is configured to latch and output the count of the counter "Co" when the ramp voltage "Vramp" is higher than the voltage "Vin".

The ramp voltage generating circuit "RG" is configured to be controlled by the controlling circuit "COM" and generate and output the ramp voltage "Vramp".

The counter "Co" is configured to be controlled by the controlling circuit "COM" and start counting when the ramp voltage "Vramp" starts increasing.

The output circuit "MUX" is configured to output the count output from the latch circuit "RC" (that is, the signal output from the detecting circuit "DC" based on the detection result) to the outside. The output circuit "MUX" is a multiplexer, for example.

The controlling circuit "COM" is configured to control the ramp voltage generating circuit "RG", the counter "Co", the row decoder "RD", and the switch circuit "SW" of the sample holding circuit "SH". In particular, the controlling circuit "COM" is configured to control turn on and off of the switch circuit "SW" of the sample holding circuit "SH" with a switch controlling signal "S1" (see FIG. 2).

Figure 3:
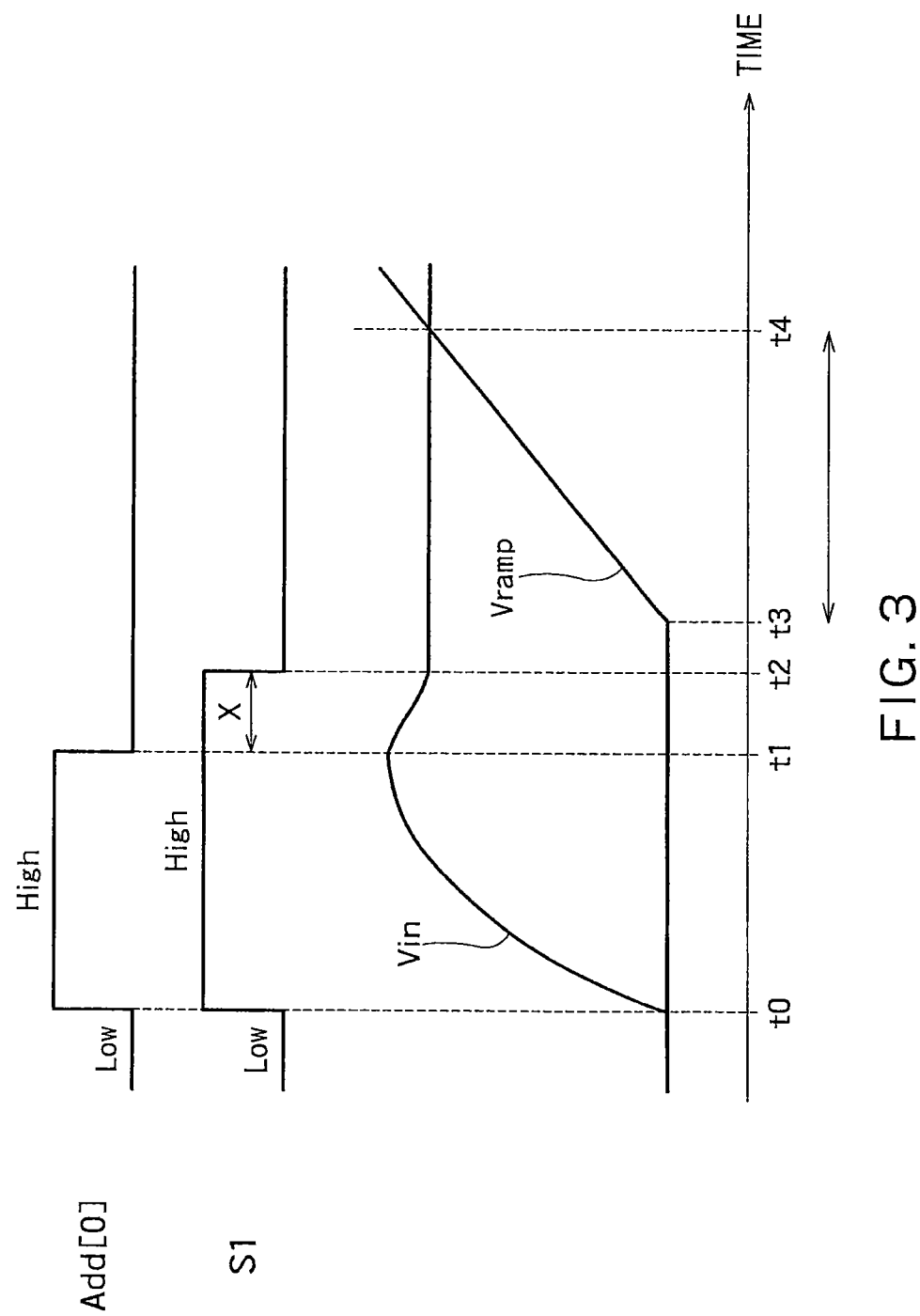
FIG. 3 is a waveform diagram showing an example of an operation waveform of the image sensor circuit 100 shown in FIG. 1.

Next, an operation of the image sensor circuit 100 having the configuration described above will be described. FIG. 3 is a waveform diagram showing an example of an operation waveform of the image sensor circuit 100 shown in FIG. 1.

As shown in FIG. 3, at a time "t0", the controlling circuit "COM" makes the address signal "Add[0]" transition from the "Low" level to the "High" level. As a result, the first MOS transistor "M1" of the light receiving cell "Ce" shown in FIG. 2 is turned on. In addition, the controlling circuit "COM" makes the switch controlling signal "S1" transition from the "Low" level to the "High" level. As a result, the switching circuit "SW" is turned on. In particular, the controlling circuit "COM" can turn on the first MOS transistor "M1" and the switch circuit "SW" in synchronization with each other as shown in FIG. 3.

That is, the controlling circuit "COM" controls the row decoder "RD" to address the light receiving cell "Ce" with the address signal to turn on the first MOS transistor "M1" and turns on the switch circuit "SW" with the switch controlling signal "S1".

As a result, the capacitor "Cp" is charged or discharged according to the voltage "Vp" responsive to the received light, thereby causing the voltage "Vin" at the sample holding terminal "TS" to change.

Then, at a time "t1", the controlling circuit "COM" makes the address signal "Add[0]" transition from the "High" level to the "Low" level. As a result, the first MOS transistor "M1" is turned off. As a result, the voltage stored in the capacitor "Cp" is sample-held.

That is, the controlling circuit "COM" controls the row decoder "RD" to turn off the first MOS transistor "M1" and then turns off the switch circuit "SW" with the switch controlling signal "S1".

Then, at a time "t2", the controlling circuit "COM" makes the switch controlling signal "S1" transition from the "High" level to the "Low" level. As a result, the switch circuit "SW" is turned off.

That is, the controlling circuit "COM" turns off the switch circuit "SW" after a lapse of a prescribed time "X" after the first MOS transistor "M1" is turned off.

In the period from the time "t1" to the time "t2" (in the period of the prescribed time "X"), a certain amount of the charges in the capacitor "Cp" sample-held leaks as the constant current "Ib".

The leakage of a certain amount of charges from the capacitor "Cp" means that the sample-held voltage "Vin" decreases by a certain offset voltage.

The certain offset voltage can be removed in a subsequent part of the circuit and therefore poses no problem.

Then, at a time "t3", the controlling circuit "COM" makes the ramp voltage generating circuit "RG" start outputting the ramp voltage "Vramp" and makes the counter "Co" start counting. As the ramp voltage "Vramp" starts increasing, the count starts increasing.

Then, the comparator "Cm" compares the voltage "Vin" at the sample holding terminal "TS" with the ramp voltage "Vramp" and outputs the comparison result signal responsive to the comparison result.

Then, at a time "t4", the ramp voltage "Vramp" becomes higher than the voltage "Vin" at the sample holding terminal "TS". In response to this, the comparator "Cm" outputs the comparison result signal that indicates that the ramp voltage "Vramp" is higher than the voltage "Vin" at the sample holding terminal "TS".

In response to this comparison result signal, the latch circuit "RC" latches and outputs the count of the counter "Co" at the point in time when the ramp voltage "Vramp" becomes higher than the voltage "Vin".

The output count is the digital value obtained by A/D-converting the received light (which is an analog signal).

The output circuit "MUX" outputs the count output from the latch circuit "RC" (that is, the signal output from the detecting circuit "DC" based on the detection result) to the outside as the A/D-converted value.

As described above, the constant current "Ib" flows to the source follower in the pixel output stage only during reading of the voltage "Vi", which is the pixel signal. In the past, it is need to flow the constant current "Ib" to the pixel output stage source follower in the period of the AD convert time also. Therefore, the power consumption can be reduced.

Furthermore, since the capacitor "Cp" including a parasitic capacitance is used as a capacitor for sample holding, the capacitor for sample holding can be provided without increasing the footprint of the image sensor circuit.

That is, the problem of the tradeoff between the power consumption and the footprint in the column of the conventional image sensor circuit can be removed.

As described above, it is essential that the switch circuit "SW" is turned off after the first MOS transistor "M1" (in the period from the time "t1" to the time "t2" in FIG. 3).

For example, even if the switch circuit "SW" is turned off before the first MOS transistor "M1", the voltage "Vin" in the capacitor "Cp" can be sample-held.

In this case, however, the capacitor "Cp" is charged according to the magnitude of the voltage "Vp", which is the pixel signal, in the period after the switch circuit "SW" is turned off and before the first MOS transistor "M1" is turned off.

The fact that the capacitor "Cp" is charged means that the sample-held voltage "Vin" increases by a certain offset voltage.

Furthermore, the charges stored in the capacitor "Cp" depends on the voltage "Vp", which is the pixel signal, and therefore, the offset voltage also varies depending on the magnitude of the pixel signal.

Therefore, it is essential that the switch circuit "SW" is turned off after the first MOS transistor "M1" (in the period from the time "t1" to the time "t2" in FIG. 3) as described above.

The number of pixels (light receiving cells) in the image sensor circuit will probably increase. As the number of pixels (light receiving cells) increases, the area of the pixel array "Ar" also increases, and the capacitance "Cp" also increases. That is, the sample hold noise decreases as the number of pixels increases.

As described above, the image sensor circuit according to this embodiment is reduced in power consumption and circuit footprint.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image sensor circuit, comprising:
a column line connected to a sample holding terminal;
a light receiving cell including a first MOS transistor that is connected between a power supply and the column line and receives an address signal at a gate thereof and a second MOS transistor that is connected in series with the first MOS transistor between the power supply and the column line and receives a voltage responsive to received light at a gate thereof;
a row decoder that generates the address signal that addresses the light receiving cell;
a sample holding circuit including a current source that is connected between the column line and a ground and outputs a constant current and a switch circuit connected in series with the current source between the column line and the ground; and
a controlling circuit that controls the row decoder and the switch circuit of the sample holding circuit,
wherein the controlling circuit
controls the row decoder to address the light receiving cell with the address signal to turn on the first MOS transistor and turns on the switch circuit with a switch controlling signal, and then
controls the row decoder to turn off the first MOS transistor and then turns off the switch circuit with the switch controlling signal.

2. The image sensor circuit according to claim 1, wherein the controlling circuit turns off the switch circuit after a lapse of a prescribed time after the first MOS transistor is turned off.

3. The image sensor circuit according to claim 1, wherein the controlling circuit turns on the first MOS transistor and the switch circuit in synchronization with each other.

4. The image sensor circuit according to claim 1, further comprising a detecting circuit that is configured to detect a voltage at the sample holding terminal and to output a signal based on the detection result.

5. The image sensor circuit according to claim 4, further comprising:
a ramp voltage generating circuit that is configured to be controlled by the controlling circuit, to generate and output ramp voltage; and
a counter that is configured to be controlled by the controlling circuit and to start counting when the ramp voltage starts increasing,
wherein the detecting circuit comprises:
a comparator that is configured to compare the voltage at the sample holding terminal with a ramp voltage, and to output a comparison result signal responsive to the comparison result; and
a latch circuit that is configured to latch and output the count of the counter when the ramp voltage is higher than the voltage at the sample holding terminal.

6. The image sensor circuit according to claim 1, wherein the first MOS transistor and the second transistor are nMOS transistors.

7. The image sensor circuit according to claim 1, wherein the switch circuit is a MOS transistor whose gate voltage is controlled by the controlling circuit.

8. The image sensor circuit according to claim 1, wherein the light receiving cell further comprises
a light receiving circuit that is configured to receive light and to output a voltage responsive to the received light to the gate of the second MOS transistor.

9. The image sensor circuit according to claim 8, wherein the light receiving circuit comprises:
- a first reset nMOS transistor that is connected to a power supply at a drain thereof and to the gate of the second MOS transistor at a source thereof;
- a second reset nMOS transistor that is connected to the gate of the second MOS transistor at a drain thereof; and
- a photo diode that is connected to the source of the second reset nMOS transistor at a cathode thereof and to the ground at a anode thereof.

10. The image sensor circuit according to claim 5, further comprising an output circuit that is configured to output the count output from the latch circuit to an outside.

11. The image sensor circuit according to claim 1, wherein the image sensor circuit comprises a plurality of light receiving cells, and
- the row decoder addresses one of the plurality of light receiving cells with the address signal.

12. The image sensor circuit according to claim 11, wherein the image sensor circuit comprises:
- the plurality of column lines; and
- a plurality of sample holding circuits provided in a one-to-one relationship with the plurality of column lines.

13. An image sensor circuit, comprising:
- a column line connected to a sample holding terminal;
- a light receiving cell including a first MOS transistor that is connected between a power supply and the column line and receives an address signal at a gate thereof and a second MOS transistor that is connected in series with the first MOS transistor between the power supply and the column line and receives a voltage responsive to received light at a gate thereof;
- a row decoder that generates the address signal that addresses the light receiving cell;
- a sample holding circuit including a current source that is connected between the column line and a ground and outputs a constant current and a switch circuit connected in series with the current source between the column line and the ground; and
- a controlling circuit that controls the row decoder and the switch circuit of the sample holding circuit.

14. The image sensor circuit according to claim 11, further comprising a detecting circuit that is configured to detect a voltage at the sample holding terminal and to output a signal based on the detection result.

15. The image sensor circuit according to claim 14, further comprising:
- a ramp voltage generating circuit that is configured to be controlled by the controlling circuit, to generate and output ramp voltage; and
- a counter that is configured to be controlled by the controlling circuit and to start counting when the ramp voltage starts increasing,
- wherein the detecting circuit comprises:
- a comparator that is configured to compare the voltage at the sample holding terminal with a ramp voltage, and to output a comparison result signal responsive to the comparison result; and
- a latch circuit that is configured to latch and output the count of the counter when the ramp voltage is higher than the voltage at the sample holding terminal.

16. The image sensor circuit according to claim 13, wherein the first MOS transistor and the second transistor are nMOS transistors.

17. The image sensor circuit according to claim 13, wherein the switch circuit is a MOS transistor whose gate voltage is controlled by the controlling circuit.

18. The image sensor circuit according to claim 13, wherein the light receiving cell further comprises
- a light receiving circuit that is configured to receive light and to output a voltage responsive to the received light to the gate of the second MOS transistor.

19. The image sensor circuit according to claim 18, wherein the light receiving circuit comprises:
- a first reset nMOS transistor that is connected to a power supply at a drain thereof and to the gate of the second MOS transistor at a source thereof;
- a second reset nMOS transistor that is connected to the gate of the second MOS transistor at a drain thereof; and
- a photo diode that is connected to the source of the second reset nMOS transistor at a cathode thereof and to the ground at a anode thereof.

20. The image sensor circuit according to claim 15, further comprising an output circuit that is configured to output the count output from the latch circuit to an outside.

* * * * *